(12) United States Patent
Benvenuti et al.

(10) Patent No.: US 12,704,969 B2
(45) Date of Patent: Aug. 11, 2026

(54) ASYMMETRIC PASS THROUGH VOLTAGE FOR REDUCTION OF CELL-TO-CELL INTERFERENCE

(71) Applicant: Micron Technology, Inc., Boise, ID (US)

(72) Inventors: Augusto Benvenuti, Lallio (IT); Giovanni Maria Paolucci, Milan (IT); Alessio Urbani, Rome (IT); Gianpietro Carnevale, Bottanuco (IT); Aurelio Giancarlo Mauri, Meda (IT)

(73) Assignee: Micron Technology, Inc., Boise, ID (US)

( * ) Notice: Subject to any disclaimer, the term of this patent is extended or adjusted under 35 U.S.C. 154(b) by 125 days.

(21) Appl. No.: 18/236,087

(22) Filed: Aug. 21, 2023

(65) Prior Publication Data

US 2024/0069749 A1 Feb. 29, 2024

Related U.S. Application Data

(60) Provisional application No. 63/402,258, filed on Aug. 30, 2022.

(51) Int. Cl.
*G06F 3/06* (2006.01)

(52) U.S. Cl.
CPC .......... *G06F 3/0619* (2013.01); *G06F 3/0655* (2013.01); *G06F 3/0679* (2013.01)

(58) Field of Classification Search
CPC .... G06F 3/0619; G06F 3/0655; G06F 3/0679; G11C 16/08; G11C 16/3459; G11C 2211/5621; G11C 2211/5648; G11C 16/26; G11C 16/3427; G11C 11/5671; G11C 16/0483
See application file for complete search history.

(56) References Cited

U.S. PATENT DOCUMENTS

| | | | | |
|---|---|---|---|---|
| 10,636,501 | B1 * | 4/2020 | Chen | G11C 11/5628 |
| 2020/0342946 | A1 * | 10/2020 | Zhao | G11C 16/3459 |
| 2022/0101923 | A1 * | 3/2022 | Park | G11C 16/10 |
| 2023/0048326 | A1 * | 2/2023 | Li | G11C 29/08 |
| 2023/0090656 | A1 * | 3/2023 | Lim | G11C 16/08 365/185.22 |
| 2023/0377643 | A1 * | 11/2023 | Xu | G11C 16/344 |

* cited by examiner

*Primary Examiner* — Jerome Leboeuf
(74) *Attorney, Agent, or Firm* — Lowenstein Sandler LLP

(57) ABSTRACT

A memory access operation is initiated to read a set of target memory cells of a target wordline of the memory device. During the memory access operation, a read voltage level is caused to be applied to the target wordline. During the memory access operation, a first pass through voltage level is caused to be applied to a first wordline adjacent to the target wordline. During the memory access operation, a second pass through voltage is caused to be applied to a second wordline adjacent to the target wordline, wherein the first pass through voltage level is less than the second pass through voltage level.

17 Claims, 12 Drawing Sheets

Figure 4:
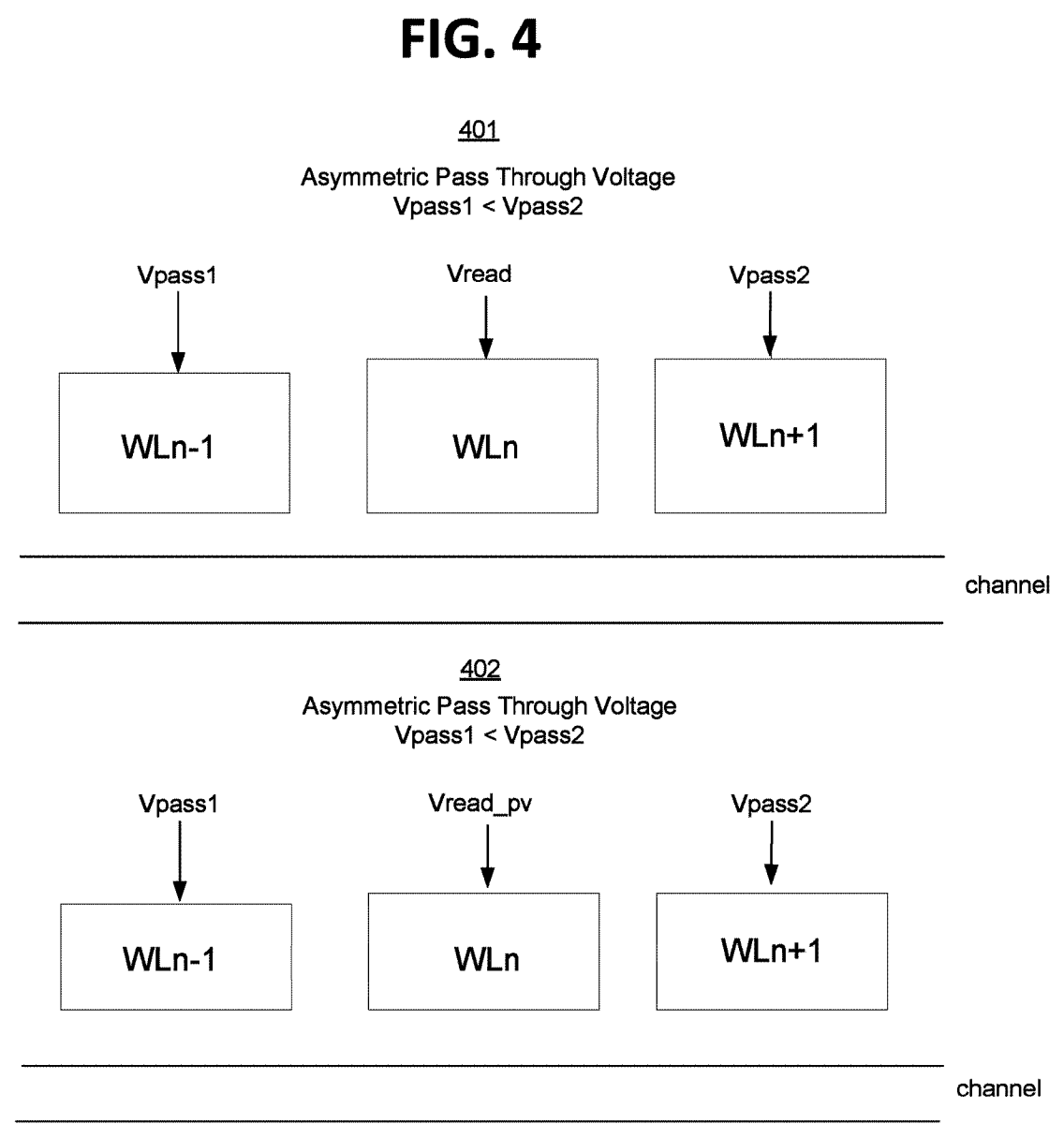

401
Asymmetric Pass Through Voltage
Vpass1 < Vpass2

Vpass1
Vread
Vpass2
WLn-1
WLn
WLn+1
channel

402
Asymmetric Pass Through Voltage
Vpass1 < Vpass2

Vpass1
Vread_pv
Vpass2
WLn-1
WLn
WLn+1
channel

Pre-aggression stage 601
Vpass1
Vpass2
WLn-1
L7
WLn
L0
WLn+1
L0
604
Leff
Drain-side
Source-side
603
Post-aggression stage 602
Vpass1
Vpass2
WLn-1
L7
WLn
L0
WLn+1
L7
604
△ Leff (post)
Drain-side
Source-side

FIG. 7

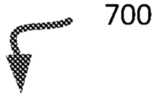

Initiate a memory access operation to read a set of target memory cells of a target wordline
710

Cause, during the memory access operation, a read voltage level to be applied to the target wordline
720

Cause, during the memory access operation, a first pass through voltage level to be applied to a first wordline adjacent to the target wordline and a second pass through voltage level to be applied to a second wordline adjacent to the target wordline, where the first pass through voltage level is the second pass through voltage level reduced by offset value
730

ASYMMETRIC PASS THROUGH VOLTAGE FOR REDUCTION OF CELL-TO-CELL INTERFERENCE

CROSS-REFERENCE TO RELATED APPLICATION

This application claims the benefit of U.S. Provisional Application No. 63/402,258, titled "Asymmetric Pass Through Voltage for Reduction of Cell-to-Cell Interference," filed Aug. 30, 2022, which is hereby incorporated herein by reference in its entirety.

TECHNICAL FIELD

Embodiments of the disclosure relate generally to memory sub-systems, and more specifically, relate to performing read and program verify operations using an asymmetric pass through voltage for reduction of cell-to-cell interference.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2A-2D are schematics of portions of an array of memory cells as could be used in a memory of the type described with reference to FIG. 1B, in accordance with one or more embodiments of the present disclosure.

FIG. 3 is a block schematic of a portion of an array of memory cells as could be used in a memory of the type described with reference to FIG. 1B, in accordance with one or more embodiments of the present disclosure.

FIG. 4 illustrates example arrangements of a target wordline and corresponding adjacent or neighboring wordlines during execution of a read operation and execution of a program verify operation, in accordance with one or more embodiments of the present disclosure.

FIG. 7 is a flow diagram of an example method to perform a memory access operation (e.g., a read operation or a program verify operation) of a target wordline including application of asymmetric pass through voltage levels to adjacent wordlines to reduce cell-to-cell interference, in accordance with one or more embodiments of the present disclosure.

DETAILED DESCRIPTION

Figure 1A:
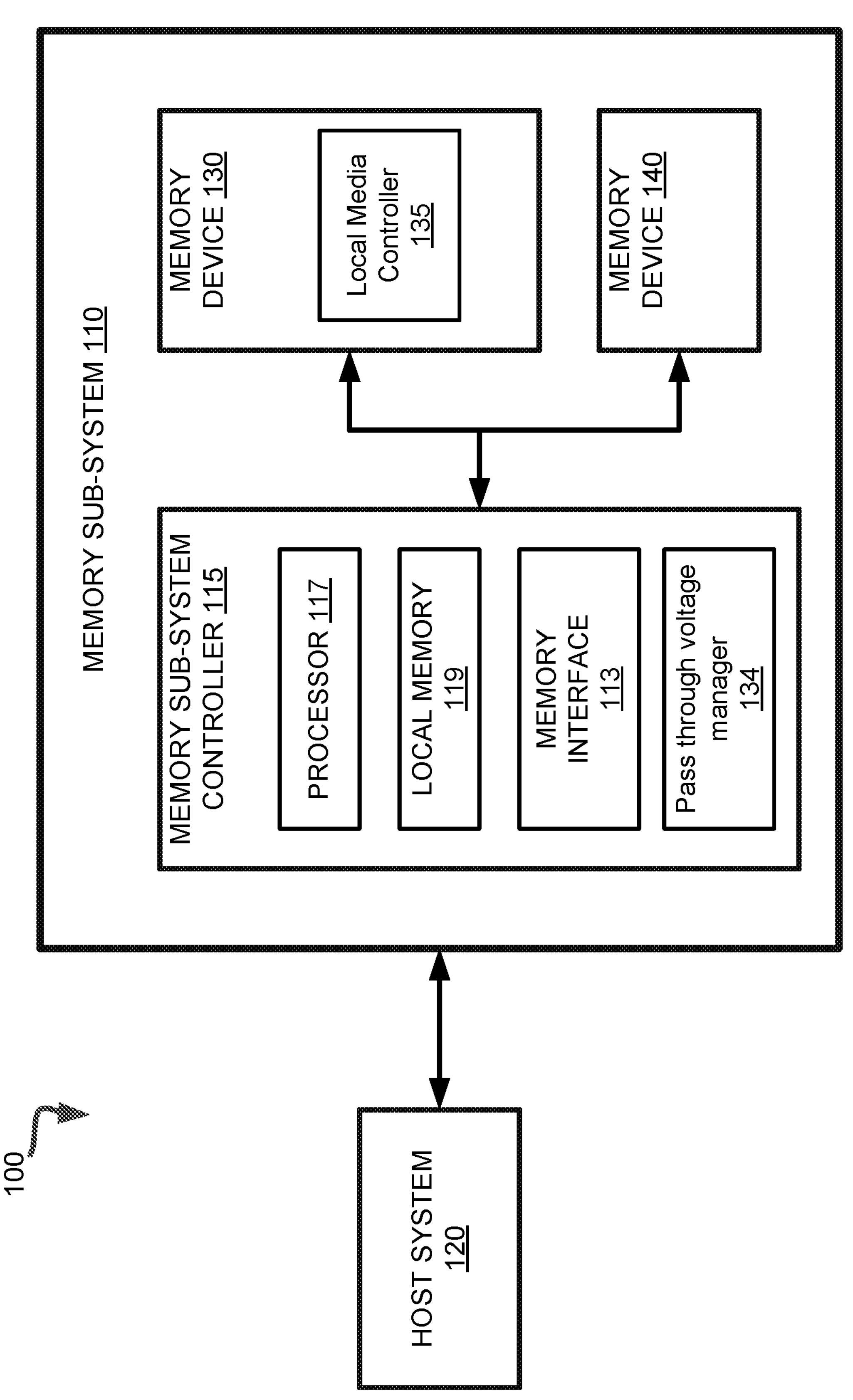
FIG. 1A illustrates an example computing system that includes a memory sub-system, in accordance with one or more embodiments of the present disclosure.

Aspects of the present disclosure are directed to execution of read operations and program verify operations using asymmetric pass through voltage levels for adjacent or neighboring wordlines to reduce cell-to-cell interference. A memory sub-system can be a storage device, a memory module, or a combination of a storage device and memory module. Examples of storage devices and memory modules are described below in conjunction with FIGS. 1A-1B. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIGS. 1A-1B. A non-volatile memory device is a package of one or more dies. Each die includes one or more planes. For some types of non-volatile memory devices (e.g., NAND devices), each plane includes a set of physical blocks. Each block consists of a set of pages. Each page includes a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

A memory device (e.g., a memory die) can include memory cells arranged in a two-dimensional or a three-dimensional grid. The memory cells are formed onto a silicon wafer in an array of columns and rows. The memory cells are joined by wordlines, which are conducting lines electrically connected to the control gates of the memory cells, and bitlines, which are conducting lines electrically connected to the drain electrodes of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane.

Some memory devices can be three-dimensional (3D) memory devices (e.g., 3D NAND devices). For example, a 3D memory device can include memory cells that are placed between sets of layers including a pillar (e.g., polysilicon pillar), a tunnel oxide layer, a charge trap (CT) layer, and a dielectric (e.g. oxide) layer. A 3D memory device can have a "top deck" corresponding to a first side and a "bottom deck" corresponding to a second side. Without loss of generality, the first side can be a drain side and the second side can be a source side. For example, a 3D memory device can be a 3D replacement gate memory device having a replacement gate structure using wordline stacking.

A memory cell ("cell") can be programmed (written to) by applying a certain voltage to the cell, which results in an electric charge being held by the cell. For example, a voltage signal $V_{CG}$ that can be applied to a control electrode of the cell to open the cell to the flow of electric current across the cell, between a source electrode and a drain electrode. More specifically, for each individual cell (having a charge Q stored thereon) there can be a threshold control gate voltage Vt (also referred to as the "threshold voltage") such that the source-drain electric current is low for the control gate voltage ($V_{CG}$) being below the threshold voltage, $V_{CG}<Vt$. The current increases substantially once the control gate voltage has exceeded the threshold voltage, $V_{CG}>Vt$. Because the actual geometry of the electrodes and gates varies from cell to cell, the threshold voltages can be different even for cells implemented on the same die. The cells can, therefore, be characterized by a distribution P of the threshold voltages, $P(Q,V_T)=dW/dV_T$, where dW represents the probability that any given cell has its threshold voltage within the interval [Vt,Vt+dVt] when charge Q is placed on the cell.

One type of cell is a single level cell (SLC), which stores 1 bit per cell and defines 2 logical states ("states") ("1" or "L0" and "0" or "L1") each corresponding to a respective $V_T$ level. For example, the "1" state can be an erased state and the "0" state can be a programmed state (L1). Another type of cell is a multi-level cell (MLC), which stores 2 bits per cell (1 bit for upper page (UP) data and 1 bit for lower page (LP) data) and defines 4 states ("11" or "L0", "10" or "L1", "01" or "L2" and "00" or "L3") each corresponding to a respective $V_T$ level. For example, the "11" state can be an erased state and the "01", "10" and "00" states can each be a respective programmed state. Another type of cell is a triple level cell (TLC), which stores 3 bits per cell (1 bit for UP data, 1 bit for LP data and 1 bit for extra page (XP) data) and defines 8 states ("111" or "L0", "110" or "L1", "101" or "L2", "100" or "L3", "011" or "L4", "010" or "L5", "001" or "L6", and "000" or "L7") each corresponding to a respective $V_T$ level. For example, the "111" state can be an erased state and each of the other states can be a respective programmed state. Another type of a cell is a quad-level cell (QLC), which stores 4 bits per cell (1 bit for UP data, 1 bit for LP data, 1 bit for XP data, and 1 bit for top page (TP) data) and defines 16 states L0-L15, where L0 corresponds to "1111" and L15 corresponds to "0000". Another type of cell is a penta-level cell (PLC), which stores 5 bits per cell and defines 32 states. Other types of cells are also contemplated. Thus, an n-level cell can use $2^n$ levels of charge to store n bits of information for n pages. A memory device can include one or more arrays of memory cells such as SLCs, MLCs, TLCs, QLCs, PLCs, etc. or any combination of such. For example, a memory device can include an SLC portion, and an MLC portion, a TLC portion, a QLC portion, or a PLC portion of cells.

A memory device can exhibit threshold voltage distributions $P(Q,V_T)$ that are narrow compared with the working range of control voltages tolerated by the cells of the device. Accordingly, multiple non-overlapping distributions $P(Q_k, Vt)$ ("valleys") can be fit into the working range allowing for storage and reliable detection of multiple values of the charge $Q_k$, k=1, 2, 3 . . . The distributions (valleys) are interspersed with voltage intervals ("valley margins") where none (or very few) of the cells of the device have their threshold voltages. Such valley margins can, therefore, be used to separate various charge states $Q_k$—the logical state of the cell can be determined by detecting, during a read operation, between which two valley margins the respective threshold voltage $V_T$ of the cell resides. Specifically, the read operation can be performed by comparing the measured threshold voltage $V_T$ exhibited by the memory cell to one or more reference voltage levels corresponding to known valley margins (e.g., centers of the margins) of the memory device.

A valley margin can also be referred to as a read window. For example, in a SLC cell, there is 1 read window that exists with respect to the 2 Vt distributions. As another example, in an MLC cell, there are 3 read windows that exist with respect to the 4 Vt distributions. As yet another example, in a TLC cell, there are 7 read windows that exist with respect to the 8 Vt distributions. Read window size generally decreases as the number of states increases. For example, the 1 read window for the SLC cell may be larger than each of the 3 read windows for the MLC cell, and each of the 3 read windows for the MLC cell may be larger than each of the 7 read windows for the TLC cell, etc. Read window budget (RWB) refers to the cumulative value of the read windows.

One or more memory access operations can be performed with respect to the memory cells of the memory device. In an illustrative example, a memory cell programming operation, which can be performed in response to receiving a program or write command from the host, can involve sequentially applying programming voltage pulses to a selected or target wordline (WLn). In some implementations, the programming pulse voltage can be sequentially ramped up from the initial voltage value (e.g., 0V) to the final voltage value (e.g., $V_{MAX}$). The unselected wordlines can, during the programming operation, be biased at a certain voltage, e.g., a pass through voltage, which is less than the programming voltage. After each programming pulse, or after a number of programming pulses, a program verify operation can be performed to determine if the threshold voltage of the one or more memory cells has increased to a desired programming level.

Cells of a memory array that are selected for execution of a memory access operation (e.g., a read operation, a program operation, an erase operation) can be referred to target cells connected to a target wordline. The target cells can be adjacent to cells connected to at least one wordline neighboring the target wordline ("adjacent wordline"). For example, the at least one adjacent wordline can be a single wordline neighboring the target wordline or a pair of wordlines neighboring the target wordline. Illustratively, the target wordline can be referred to as an nth wordline (WLn), and the at least one adjacent wordline can include at least one of adjacent wordline n−1 (WLn−1) or adjacent wordline n+1 (WLn+1). For example, in a 3D memory device, the set of adjacent wordlines can include a wordline located directly above the target wordline and/or a wordline located directly below the target wordline.

Each target cell has a respective group of adjacent cells. Each group of adjacent cells includes at least one cell that neighbors its respective target cell (e.g., one cell connected to WLn−1 and/or one cell connected to WLn+1). More specifically, each target cell can be connected to the same bitline as each cell of the respective group of adjacent cells, such that the target cell and the cells of the respective group of adjacent cells are within the same string. Accordingly, each group of adjacent cells can include a single adjacent cell, or a pair of adjacent cells connected to a same bitline as a respective target cell.

A cell (e.g., NAND cell) of a block can store data in the form of the threshold voltage, which is a lowest voltage at which the cell can be activated (i.e., switched on). During a read operation and a program verify operation (i.e. a "target cell"), a read reference voltage ($V_{ref}$) can be applied to an associated wordline, and a sense amplifier connected to an associated bitline can be used to sense whether the read cell has been switched on. More specifically, if $V_{ref}$ is higher than a threshold voltage (Vt) of the read cell, then the read cell is turned on. It is noted that only one cell per bitline can be read at a time. Since the cells of a bitline are connected in series, all transistors for cells of the bitline that are not being read ("unread cells") need to be kept on during the read operation in order for the read output of the read cell to pass through to the sense amplifier. To achieve this, a pass through voltage (Vpass) can be applied to the wordlines of the unread cells to keep the unread cells on. More specifically, Vpass is a voltage that is chosen to be higher than all of the Vt's of the unread cells, but lower than a programming voltage, to ensure a memory cell is switched on. Although Vpass is a lower voltage than the programming voltage, the application of Vpass can affect (e.g., increase) the threshold voltage and thus alter logic states of the unread cells of the block via tunneling currents. This phenomenon is referred to as "read disturb." As more read operations are applied within the block, the accumulation of read disturb over time can lead to read disturb errors.

Cell-to-cell interference (also referred to as "C2C interference") may exist in a memory array between the target cells and their respective groups of adjacent cells. Cell-to-cell interference can lead to lateral charge migration and Vt distribution shift. Cell-to-cell interference, in addition to intrinsic charge loss, can further lead to a widening of $V_T$ distributions. The $V_T$ distribution widening can cause RWB degradation, which can negatively affect memory device reliability. For example, RWB degradation can lead to an increase in the number of errors (e.g., bit errors) and/or error rate (e.g., bit error rate (BER)).

Certain memory devices include scaling of the distance between gates of adjacent memory cells (i.e., pillar pitch). However, pillar pitch scaling can result in an increase in cell-to-cell (C2C) interference where a threshold voltage shift of one or more memory cells can influence the threshold voltage of one or more neighboring memory cells through parasitic capacitance-coupling effect. The increase of C2C interference disadvantageously results in an expansion of the corresponding threshold voltage distributions in order to accommodate all possible threshold voltages for a given state and a reduction in the read window budget (RWB) corresponding to the programming distributions associated with the various programming levels. The RWB can refer to the cumulative value (e.g., in voltage) of a number (e.g., seven) of distances (e.g., measured in voltage) between adjacent threshold voltage distributions at a particular BER.

C2C interference can be increased due to multiple causes including a fringing field effect and a parasitic charge effect. A fringing field effect is the capacitive coupling of electrons programmed underneath the gate confinement of an aggressor memory cell (i.e., a memory cell being programmed). A parasitic charge effect is due to the continuity of the charge storage nitride film or charge trap (CT) layer throughout the pillar, whereby electrons are programmed into one or more inter-cell regions of the CT layer between adjacent memory cells (e.g., an aggressor memory cell and one or more victim memory cells). For example, the parasitic charge effect occurs during programming of an aggressor memory cell through the creation of electric fields due to application of a pass voltage (Vpass) on a victim memory cell (i.e., a memory cell that is not being programmed) and a program voltage (Vpgm) on the aggressor memory cell. These parasitic charges make it difficult to turn on the inter-wordline region, thereby increasing the threshold voltage of the victim memory cell after programming an adjacent aggressor memory cell.

In the inter-cell region of the CT layer, parasitic charges are created near both the aggressor memory cell and the victim memory cell. However, because the parasitic charges near the victim memory cell are injected into the CT layer during the programming of the victim memory cell, only parasitic charges near the aggressor memory cell contribute to the increase of C2C interference. A program verify operation can be executed following each program pulse so these parasitic charges do not contribute to an upper tail of the victim memory cell. However, the parasitic charges near the aggressor memory cell cause the injection of electrons into the CT layer after the victim memory cell finishes programming, and therefore contributes to the undesirable C2C interference.

C2C interference can result in the loss of RWB in view of the Vt difference between cells on a target wordline (WLn) and neighboring wordlines (e.g., WLn−1 and WLn+1). Specifically, cell-to-cell interference can cause the threshold voltage of the target wordline (WLn) to shift up, with a larger shift occurring as the threshold voltage of WLn+1 (i.e., an aggressor wordline) increases. A typical programming operation includes an order of programming of WLn−1, WLn, and WLn+1. For example, in a TLC memory device, a high C2C coupling occurs on WLn (i.e., the target or victim wordline) due to the prior programming of WLn−1, which limits the RWB.

One approach to addressing the effects of the C2C coupling includes increasing the pass through voltage (Vpass) (i.e., a bias voltage) applied to the immediately adjacent wordlines (WLn−1 and WLn+1) during a memory access operation associated with the target wordline (WLn). In this approach, when executing a read operation or read sub-operation of a program verify operation on WLn, a symmetric or equal pass through voltage (Vpass) is applied to both of the immediately adjacent wordlines (WLn−1 and WLn+1). However, applying the same Vpass level (i.e., a symmetric Vpass level) to both WLn−1 and WLn+1 increases the read disturb effects. The increased read disturb and C2C coupling associated with the application of a symmetric Vpass to WLn−1 and WLn+1 increases the programming time (Tprog) and reduces the reliability of the memory device.

Aspects of the present disclosure address the above and other deficiencies by performing a read operation and a program verify operation on a target wordline (WLn) using an asymmetric pass through voltage scheme. According to embodiments, during the read operation (i.e., a read operation or a read sub-operation of a program verify operation), a first pass through voltage (Vpass1) is applied to WLn−1 and a second pass through voltage (Vpass2) is applied to WLn+1, where Vpass1 is less than Vpass2. In an embodiment, Vpass1 is set to a voltage level equal to Vpass2 reduced by an offset voltage level (Vpass_offset).

Advantageously, application of the asymmetric pass through voltages to the immediately adjacent wordlines (i.e., Vpass1 applied to WLn−1 and Vpass2 applied to WLn+1; where Vpass1 is less than Vpass2) during a read operation or a read sub-operation of a program verify operation of a target wordline (WLn), a bottleneck of sensed current flowing (i.e., current sensed by a sensed amplifier) via a channel region associated with WLn moves toward WLn−1 and away from an aggression-side, which reduces a sensitivity of a victim memory cell (i.e., a memory cell that has not been programmed) to a threshold voltage (Vt) of the aggressor memory cell and lowers the cell-to-cell interference.

By applying a lower or reduced relative pass through voltage level (Vpass1) to the first wordline (WLn−1) as compared to the pass through voltage level (Vpass2) applied to the second wordline (WLn+1) during the execution of a read operation or a program verify operation on a target wordline (WLn), a change in an effective length of a channel region of the memory cell is reduced. The reduction of the relative change in the effective channel length reduces short channel effects and lowers the threshold voltage change associated with the programming aggression, which lowers the cell-to-cell interference. Further details performing read operations and program verify operations on a target wordline (WLn) using an asymmetric pass through voltage applied to the neighboring wordlines (Vpass1 applied to WLn−1 and Vpass2 applied to WLn+1) are described herein below with reference to FIGS. 1-8.

Advantages of the present disclosure include, but are not limited to, a reduction in C2C interference in a memory device. Furthermore, the application of asymmetric pass through voltages to neighboring wordlines during a read operation or read sub-operation of a program verify operation in accordance with the present disclosure can lead to improved RWB.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory page buffers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system controller 115 can implement a pass through voltage manager 134 that can perform a read operation and a program verify operation (i.e., a read sub-operation of the program verify operation) on a target wordline (WLn) using an asymmetric pass through voltage scheme. According to embodiments, during application of a read voltage (for a read operation or a read sub-operation of a program verify operation), the pass through voltage manager 134 causes a first pass through voltage (Vpass1) to be applied to WLn−1 and a second pass through voltage (Vpass2) to be applied to WLn+1 (also referred to as a second wordline adjacent to the target wordline), where Vpass1 is less than Vpass2. In an embodiment, Vpass1 is set to a voltage level equal to Vpass2 reduced by an offset voltage level (Vpass_offset) (i.e., Vpass1=Vpass2−Vpass_offset).

In an embodiment, the pass through voltage manager 134 causes application of Vpass1 to WLn−1 and Vpass2 to WLn+1 when read voltages above a lowest read voltage (R1) are applied to the target wordline WLn (i.e., asymmetric pass through voltages for R2, R3, R4 . . . Rfinal). In this embodiment, the pass through voltage manager 134 causes application of a symmetric pass through voltage (Vpass) to both WLn−1 and WLn+1 when the lowest read voltage (R1) is applied to the target wordline (i.e., a symmetric pass through voltage (Vpass) is applied to both WLn−1 and WLn+1 for R1).

In an embodiment, the pass through voltage manager 134 causes application of Vpass1 to WLn−1 and Vpass2 to WLn+1 (i.e., Vpass1=Vpass2−Vpass_offset) when all read voltage levels (R1, R2, R3 . . . Rfinal) are applied to the target wordline WLn (i.e., asymmetric pass through voltages for all read levels of the read operation or read sub-operation of a program verify operation). According to embodiments, a sensed data value (e.g., a current level) associated with the target wordline is used to determine completion of the memory access operation (i.e., completion of the read operation of the target wordline).

Figure 1B:
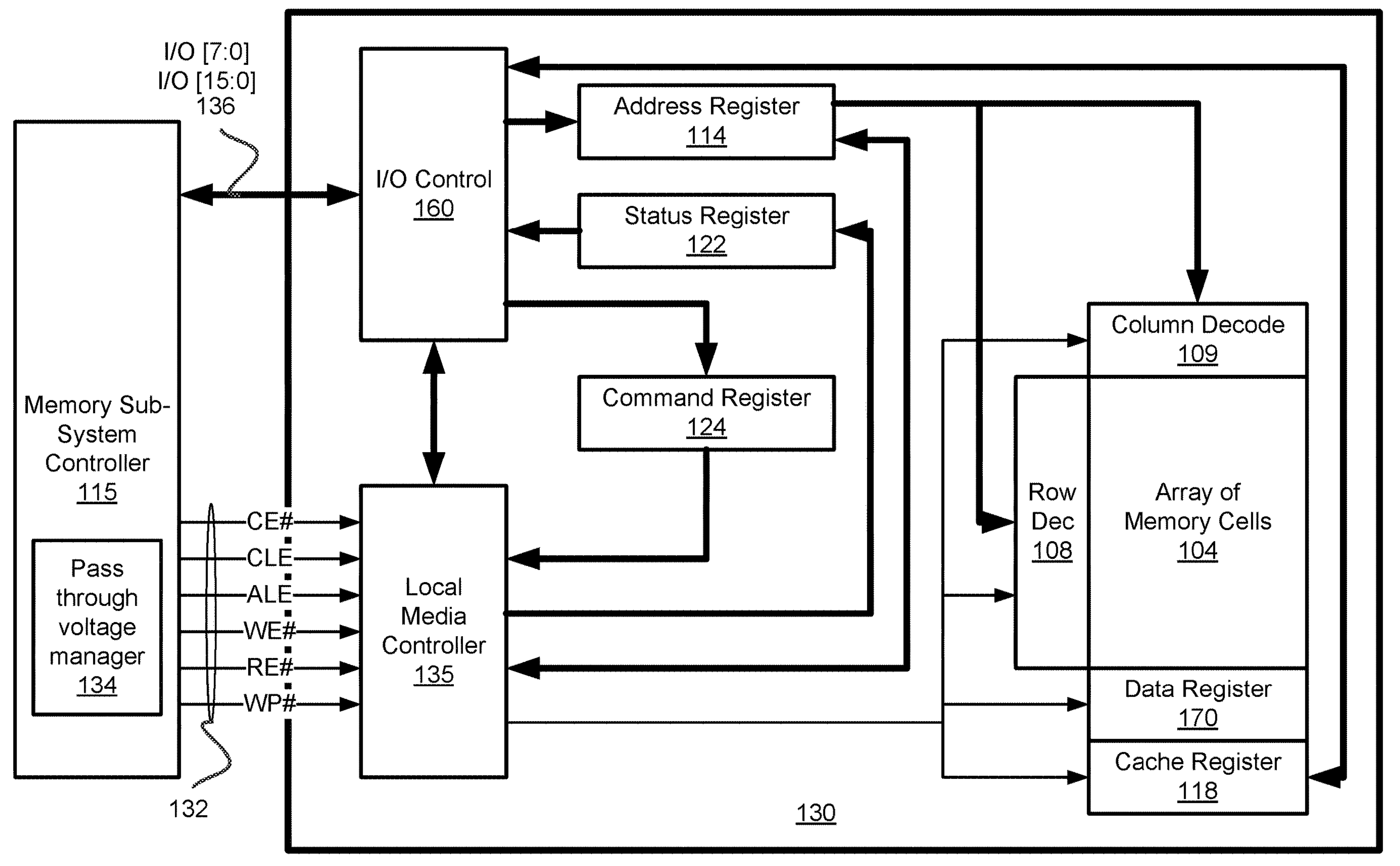
FIG. 1B is a block diagram of a memory device in communication with a memory sub-system controller of a memory sub-system, in accordance with one or more embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are connected to the same access line (e.g., a wordline) while memory cells of a logical column are selectively connected to the same data line (e.g., a bitline). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address page buffer 114 is in communication with I/O control circuitry 160 and row decode circuitry 108 and column decode circuitry 109 to latch the address signals prior to decoding. A command page buffer 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses. In one embodiment, local media controller 135 includes the pass through voltage manager 134, which can implement the corrective program verify operation on memory device 130.

The local media controller 135 is also in communication with a cache register 118. Cache register 118 latches data, either incoming or outgoing, as directed by the local media controller 135 to temporarily store data while the array of memory cells 104 is busy writing or reading, respectively, other data. During a program operation (e.g., write operation), data may be passed from the cache register 118 to the data register 170 for transfer to the array of memory cells 104; then new data may be latched in the cache register 118 from the I/O control circuitry 160. During a read operation, data may be passed from the cache register 118 to the I/O control circuitry 160 for output to the memory sub-system controller 115; then new data may be passed from the data register 170 to the cache register 118. The cache register 118 and/or the data register 170 may form (e.g., may form a portion of) a page buffer of the memory device 130. A page buffer may further include sensing devices (not shown in FIG. 1B) to sense a data state of a memory cell of the array of memory cells 204, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands may be received over input/output (I/O) pins [7:0] of I/O bus 136 at I/O control circuitry 160 and may then be written into command page buffer 124. The addresses may be received over input/output (I/O) pins [7:0] of I/O bus 136 at I/O control circuitry 160 and may then be written into address page buffer 114. The data may be received over input/output (I/O) pins [7:0] for an 8-bit device or input/output (I/O) pins [15:0] for a 16-bit device at I/O control circuitry 160 and then may be written into cache register 118. The data may be subsequently written into data register 170 for programming the array of memory cells 104.

In an embodiment, cache register 118 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIGS. 1A-1B has been simplified. It should be recognized that the functionality of the various block components described with reference to FIGS. 1A-1B may not necessarily be segregated to distinct components or component portions of an integrated circuit device. For example, a single component or component portion of an integrated circuit device could be adapted to perform the functionality of more than one block component of FIGS. 1A-1B. Alternatively, one or more components or component portions of an integrated circuit device could be combined to perform the functionality of a single block component of FIGS. 1A-1B. Additionally, while specific I/O pins are described in accordance with popular conventions for receipt and output of the various signals, it is noted that other combinations or numbers of I/O pins (or other I/O node structures) may be used in the various embodiments.

Figure 2A:
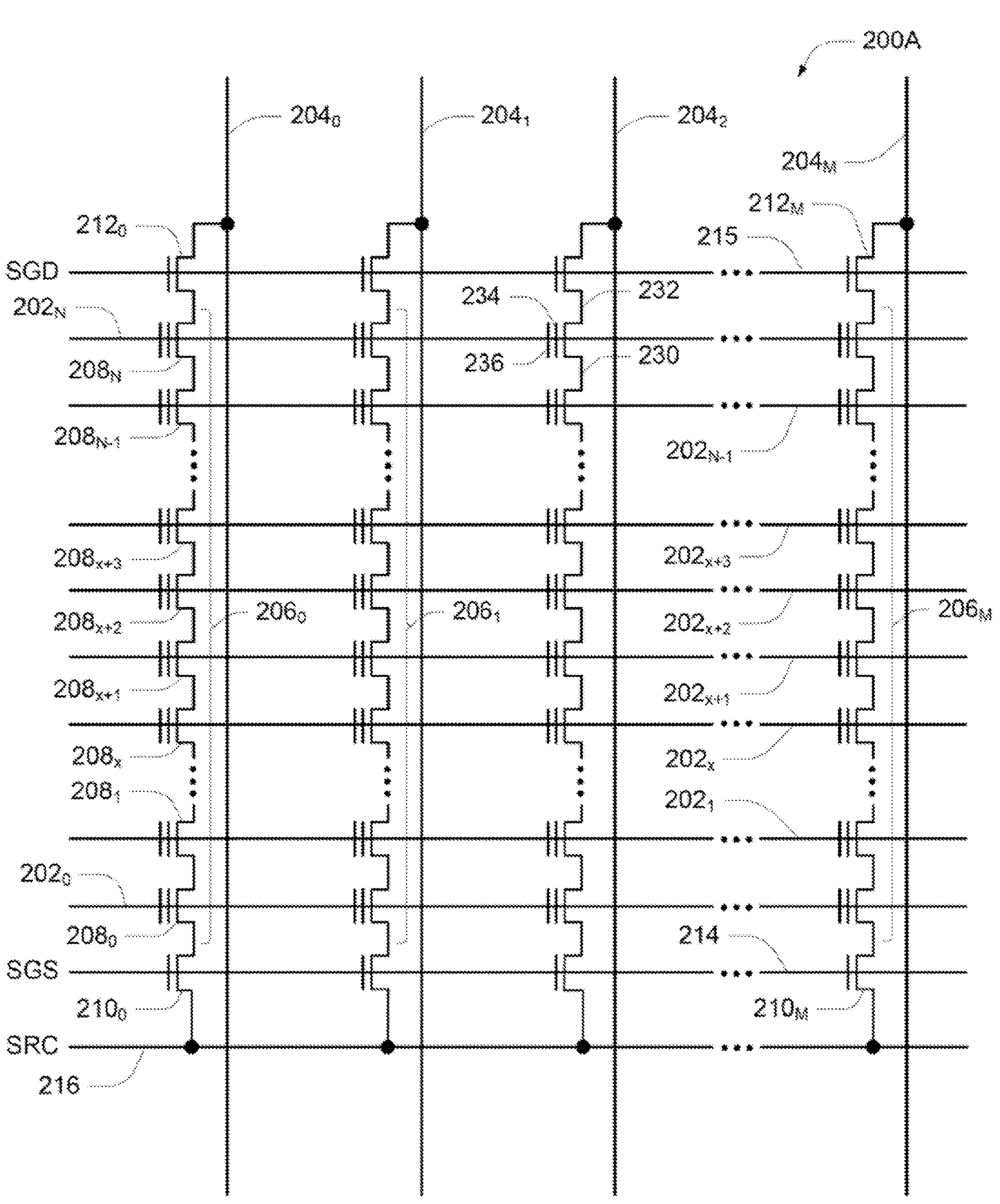
Figure 2B:
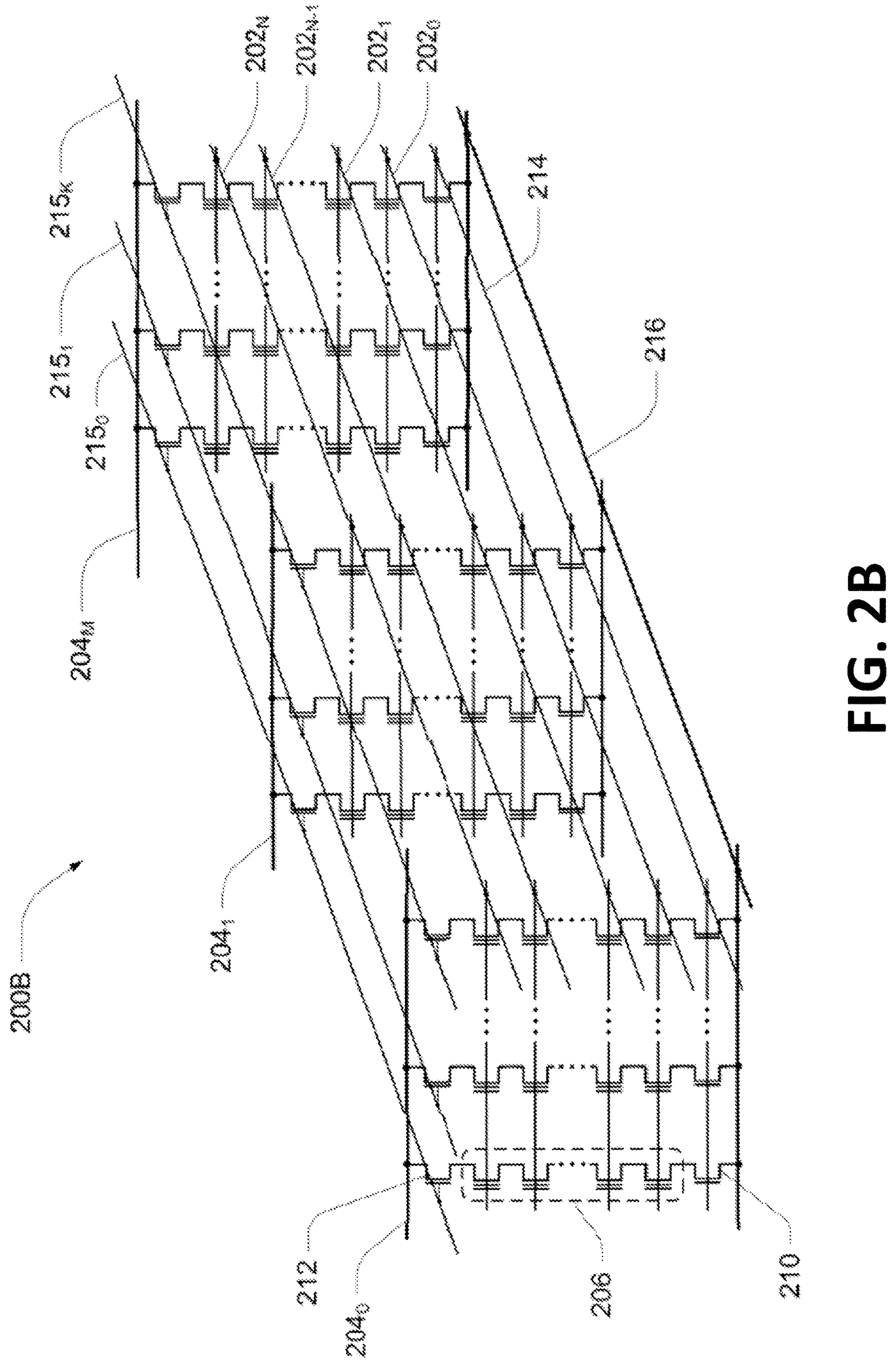
Figure 2C:
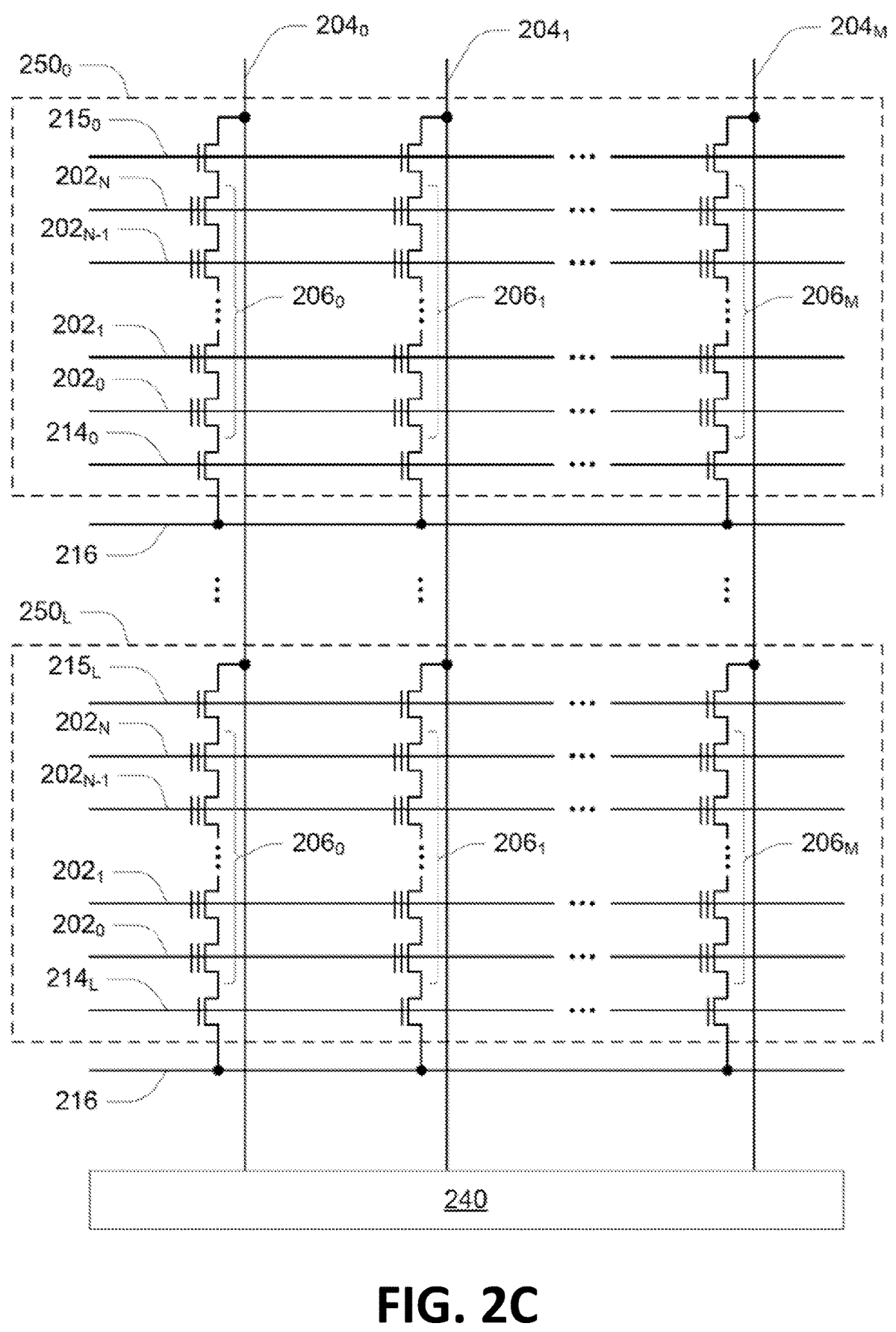

FIGS. 2A-2C are diagrams of portions of an example array of memory cells included in a memory device, in accordance with some embodiments of the present disclosure. For example, FIG. 2A is a schematic of a portion of an array of memory cells 200A as could be used in a memory device (e.g., as a portion of array of memory cells 104). Memory array 200A includes access lines, such as wordlines $202_0$ to $202_N$, and a data line, such as bitline 204. The wordlines 202 may be connected to global access lines (e.g., global wordlines), not shown in FIG. 2A, in a many-to-one relationship. For some embodiments, memory array 200A may be formed over a semiconductor that, for example, may be conductively doped to have a conductivity type, such as a p-type conductivity, e.g., to form a p-well, or an n-type conductivity, e.g., to form an n-well.

Memory array 200A can be arranged in rows each corresponding to a respective wordline 202 and columns each corresponding to a respective bitline 204. Rows of memory cells 208 can be divided into one or more groups of physical pages of memory cells 208, and physical pages of memory cells 208 can include every other memory cell 208 commonly connected to a given wordline 202. For example, memory cells 208 commonly connected to wordline $202_N$ and selectively connected to even bitlines 204 (e.g., bitlines $204_0$, $204_2$, $204_4$, etc.) may be one physical page of memory cells 208 (e.g., even memory cells) while memory cells 208 commonly connected to wordline $202_N$ and selectively connected to odd bitlines 204 (e.g., bitlines $204_1$, $204_3$, $204_5$, etc.) may be another physical page of memory cells 208 (e.g., odd memory cells). Although bitlines $204_3$-$204_5$ are not explicitly depicted in FIG. 2A, it is apparent from the figure that the bitlines 204 of the array of memory cells 200A may be numbered consecutively from bitline $204_0$ to bitline $204_M$. Other groupings of memory cells 208 commonly connected to a given wordline 202 may also define a physical page of memory cells 208. For certain memory devices, all memory cells commonly connected to a given wordline might be deemed a physical page of memory cells. The portion of a physical page of memory cells (which, in some embodiments, could still be the entire row) that is read during a single read operation or programmed during a single programming operation (e.g., an upper or lower page of memory cells) might be deemed a logical page of memory cells. A block of memory cells may include those memory cells that are configured to be erased together, such as all memory cells connected to wordlines $202_0$-$202_N$ (e.g., all strings 206 sharing common wordlines 202). Unless expressly distinguished, a reference to a page of memory cells herein refers to the memory cells of a logical page of memory cells.

Each column can include a string of series-connected memory cells (e.g., non-volatile memory cells), such as one of strings $206_0$ to $206_M$. Each string 206 can be connected (e.g., selectively connected) to a source line 216 (SRC) and can include memory cells $208_0$ to $208_N$. The memory cells 208 of each string 206 can be connected in series between a select gate 210, such as one of the select gates $210_0$ to $210_M$, and a select gate 212, such as one of the select gates $212_0$ to $212_M$. In some embodiments, the select gates $210_0$ to $210_M$ are source-side select gates (SGS) and the select gates $212_0$ to $212_M$ are drain-side select gates. Select gates $210_0$ to $210_M$ can be connected to a select line 214 (e.g., source-side select line) and select gates $212_0$ to $212_M$ can be connected to a select line 215 (e.g., drain-side select line). The select gates 210 and 212 might represent a plurality of select gates connected in series, with each select gate in series configured to receive a same or independent control signal. A source of each select gate 210 can be connected to SRC 216, and a drain of each select gate 210 can be connected to a memory cell $208_0$ of the corresponding string 206. Therefore, each select gate 210 can be configured to selectively connect a corresponding string 206 to SRC 216. A control gate of each select gate 210 can be connected to select line 214. The drain of each select gate 212 can be connected to the bitline 204 for the corresponding string 206. The source of each select gate 212 can be connected to a memory cell $208_N$ of the corresponding string 206. Therefore, each select gate 212 might be configured to selectively connect a corresponding string 206 to the bitline 204. A control gate of each select gate 212 can be connected to select line 215.

In some embodiments, and as will be described in further detail below with reference to FIG. 2B, the memory array in FIG. 2A is a three-dimensional memory array, in which the strings 206 extend substantially perpendicular to a plane containing SRC 216 and to a plane containing a plurality of bitlines 204 that can be substantially parallel to the plane containing SRC 216.

FIG. 2B is another schematic of a portion of an array of memory cells 200B (e.g., a portion of the array of memory cells 104) arranged in a three-dimensional memory array structure. The three-dimensional memory array 200B may incorporate vertical structures which may include semiconductor pillars where a portion of a pillar may act as a channel region of the memory cells of strings 206. The strings 206 may be each selectively connected to a bitline $204_0$-$204_M$ by a select gate 212 and to the SRC 216 by a select gate 210. Multiple strings 206 can be selectively connected to the same bitline 204. Subsets of strings 206 can be connected to their respective bitlines 204 by biasing the select lines $215_0$-$215_L$ to selectively activate particular select gates 212 each between a string 206 and a bitline 204. The select gates 210 can be activated by biasing the select line 214. Each wordline 202 may be connected to multiple rows of memory cells of the memory array 200B. Rows of memory cells that are commonly connected to each other by a particular wordline 202 may collectively be referred to as tiers.

FIG. 2C depicts groupings of NAND strings 206 into blocks of memory cells 250, e.g., blocks of memory cells $250_0$-$250_L$. Blocks of memory cells 250 can be groupings of memory cells 208 that can be erased together in a single erase operation, sometimes referred to as erase blocks. Each block of memory cells 250 can represent those NAND strings 206 commonly associated with a single select line 215, e.g., select line $215_0$. The source 216 for the block of memory cells $250_0$ can be a same source as the source 216 for the block of memory cells $250_L$. For example, each block of memory cells $250_0$-$250_L$ can be commonly selectively connected to the source 216. Access lines 202 and select lines 214 and 215 of one block of memory cells 250 can have no direct connection to access lines 202 and select lines 214 and 215, respectively, of any other block of memory cells of the blocks of memory cells $250_0$-$250_L$.

The bitlines $204_0$-$204_M$ can be connected (e.g., selectively connected) to a buffer portion 240, which can be a portion of the page buffer 152 of the memory device 130. The buffer portion 240 can correspond to a memory plane (e.g., the set of blocks of memory cells $250_0$-$250_L$). The buffer portion 240 can include sense circuits (which can include sense amplifiers) for sensing data values indicated on respective bitlines 204.

Figure 2D:
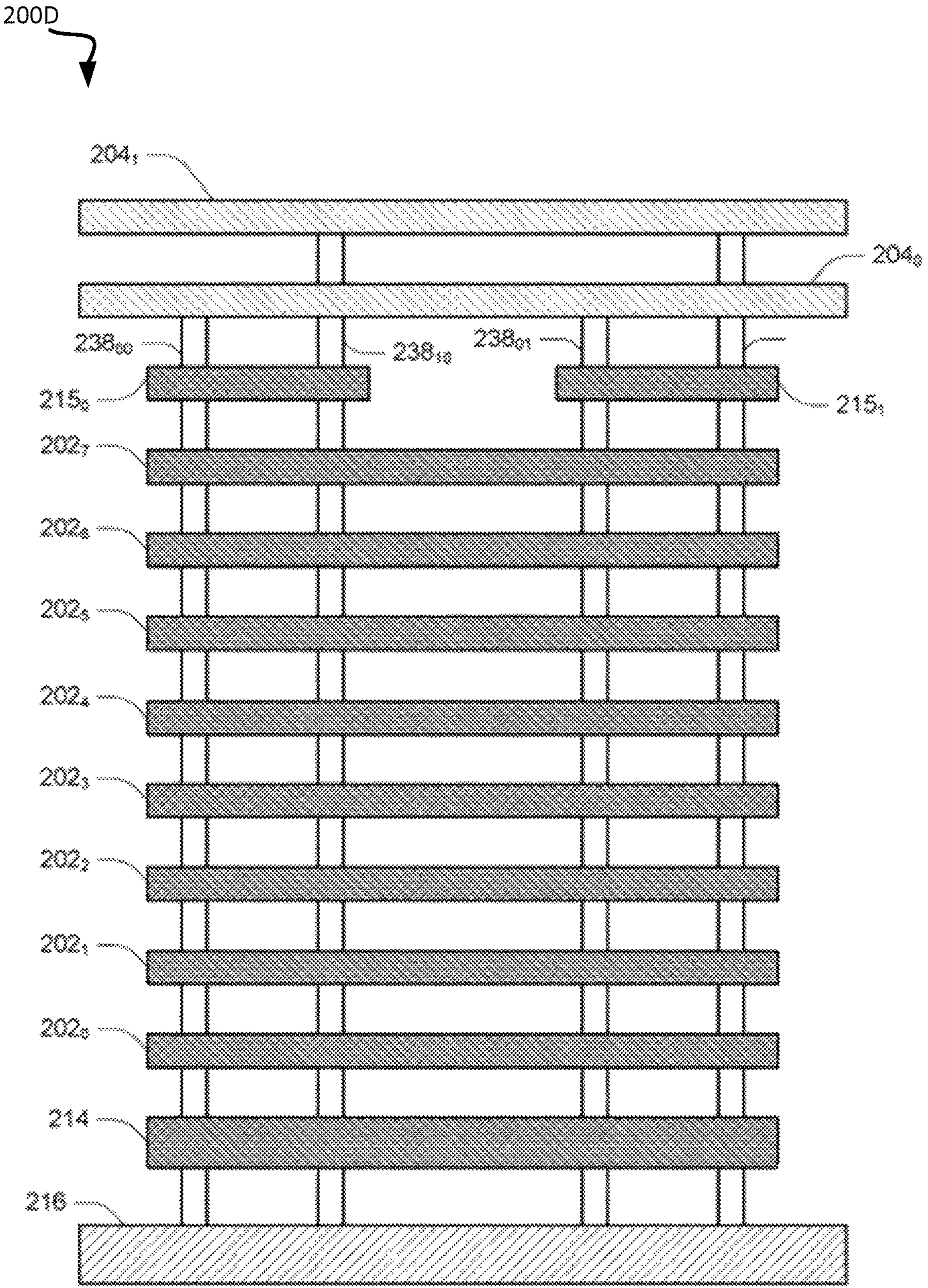

FIG. 2D is a diagram of a portion of an array of memory cells 200D (e.g., a portion of the array of memory cells 104). Channel regions (e.g., semiconductor pillars) $238_{00}$ and $238_{01}$ represent the channel regions of different strings of series-connected memory cells (e.g., strings 206 of FIGS. 2A-2C) selectively connected to the bitline $204_0$. Similarly, channel regions $238_{10}$ and $238_{11}$ represent the channel regions of different strings of series-connected memory cells (e.g., NAND strings 206 of FIGS. 2A-2C) selectively connected to the bitline $204_1$. A memory cell (not depicted in FIG. 2D) may be formed at each intersection of an wordline 202 and a channel region 238, and the memory cells corresponding to a single channel region 238 may collectively form a string of series-connected memory cells (e.g., a string 206 of FIGS. 2A-2C). Additional features might be common in such structures, such as dummy wordlines, segmented channel regions with interposed conductive regions, etc.

Figure 3:
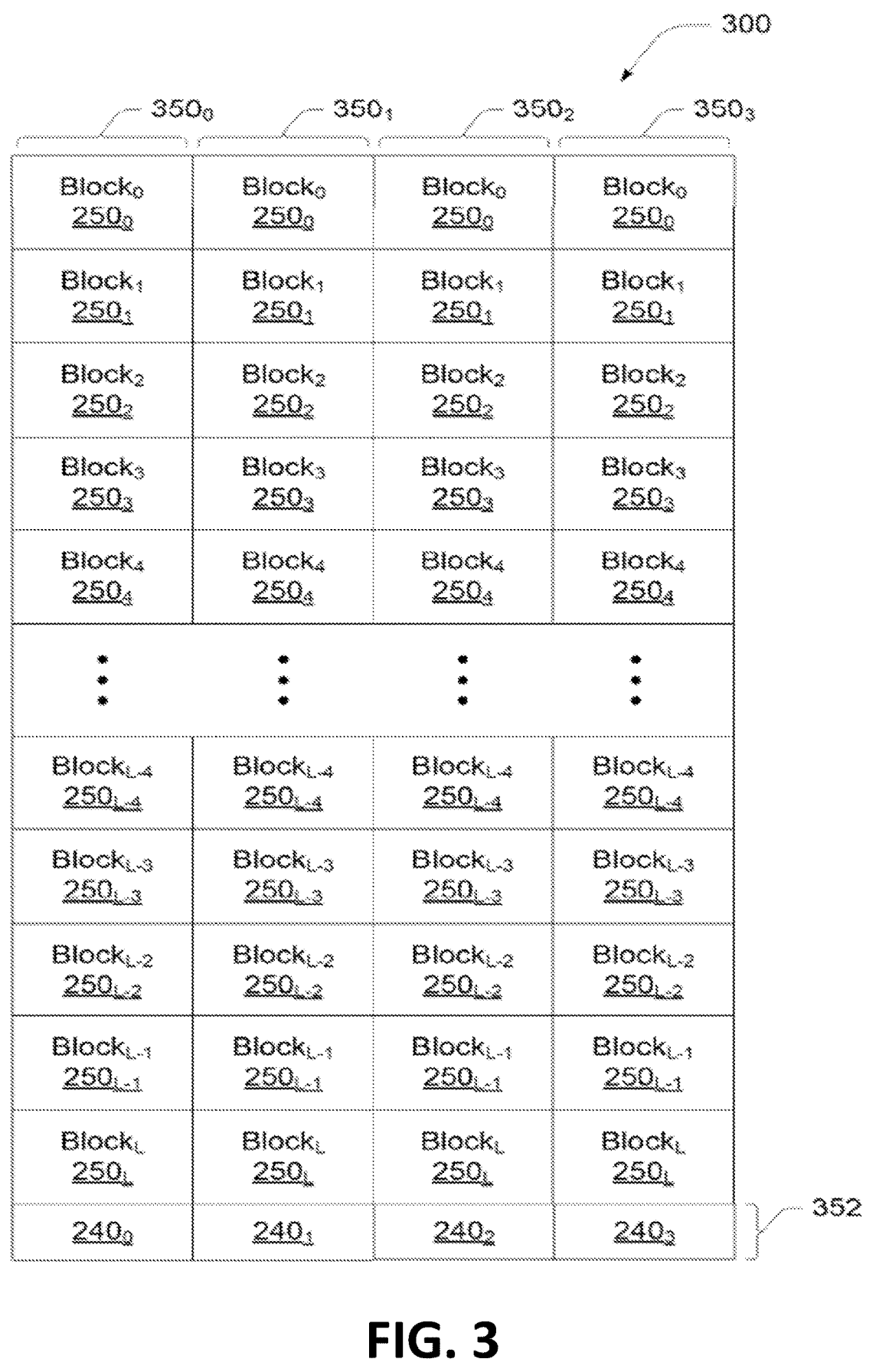

FIG. 3 is a block schematic of a portion of an array of memory cells 300 as could be used in a memory of the type described with reference to FIG. 1B. The array of memory cells 300 is depicted as having four memory planes 350 (e.g., memory planes $350_0$-$350_3$), each in communication with a respective buffer portion 240, which can collectively form a page buffer 352. While four memory planes 350 are depicted, other numbers of memory planes 350 can be commonly in communication with a page buffer 352. Each memory plane 350 is depicted to include L+1 blocks of memory cells 250 (e.g., blocks of memory cells $250_0$-$250_L$).

FIG. 4 illustrates example arrangements of a target wordline (WLn) and corresponding adjacent or neighboring wordlines (WLn−1 and WLn+1) during execution of a read operation (401) and execution of a program verify operation (402), according to embodiments of the present disclosure. As shown in the example 401, a read operation is executed to read a set of target cells associated with a selected or target wordline (WLn) including application of asymmetric pass through voltage levels to WLn−1 and WLn+1. In the read operation, during application of a read voltage (Vread) to the target wordline, a first pass through voltage (Vpass1) is applied to WLn−1 and a second pass through voltage (Vpass2) is applied to WLn+1.

In an embodiment, for the lowest read level (R1) on the target wordline (WLn), a symmetric pass through voltage is applied to both WLn−1 and WLn+1 (i.e., the same Vpass is applied to WLn−1 and WLn+1) and the asymmetric pass through voltages (Vpass1 applied to WLn−1 and Vpass2 applied to WLn+1) for all other read levels (e.g., R2, R3 . . . R15 for a QLC memory device). According to this embodiment, processing logic (e.g., processing logic of the memory sub-system controller) determines the read level associated with the target wordline and perform the following actions: 1) if the read level is R1, apply the same Vpass to WLn−1 and WLn+1; or 2) if the read level is R2 or greater, apply Vpass1 to WLn−1 and Vpass2 to WLn+1, where Vpass1=Vpass2−Vpass_offset.

In another embodiment, the asymmetric pass through voltages (Vpass1 applied to WLn−1 and Vpass2 applied to WLn+1) is applied for all read levels of WLn (e.g., R1, R2, R3 . . . R15 for a QLC memory device). In this embodiment, processing logic causes application of Vpass1 to WLn−1 and Vpass2 to WL+1 for all read levels of WLn.

In a second example 402, a program verify operation is executed to verify a programming of a set of target cells associated with the selected or target wordline (WLn) including application of the asymmetric pass through voltage levels to WLn−1 and WLn+1. In a read sub-operation of the program verify operation, during application of a read voltage (Vread_pv) to the target wordline, a first pass through voltage (Vpass1) is applied to WLn−1 and a second pass through voltage (Vpass2) is applied to WLn+1.

According to embodiments, in examples 401 and 402, Vpass1 is determined in accordance with the following expression:

$$Vpass1=Vpass2-Vpass\_offset;$$

where Vpass_offset is in a range of approximately 0.1V to approximately 1.5V. For example, Vpass2 can be in a range of approximately 6.0V to approximately 7.5V and Vpass1 can be in a range of approximately 4.5V to 6.0V. In an example, Vpass2 can be approximately 6.5V, Vpass_offset can be approximately 0.7V, and Vpass1 can be approximately 5.8V.

According to embodiments, the pass through voltage applied to the first wordline (i.e., WLn−1) adjacent to the target wordline (WLn) is lower than the pass through voltage applied to a second wordline (WLn+1) adjacent to the target wordline during the execution of a read operation on the target wordline and the execution of a program verify operation on the target wordline, where the order of programming is WLn−1 followed by WLn followed by WLn+1, regardless of the “drain to source” or “source to drain” program scheme. Advantageously, the application of Vpass1 to WLn−1 that is lower than Vpass applied to WLn+1 increases the read window budget by reducing the C2C coupling on WLn when programming WLn+1. Furthermore, the application of asymmetric pass through voltage levels to WLn−1 and WLn+1 reduces read disturb as a result of the lower pass through voltage (Vpass1) on WLn−1. In addition, the asymmetric approach during read operations and program verify operations produces a higher neutral threshold voltage and increased retention due to the need for a lower trapped charge on programmed levels in the storage node.

In an embodiment, symmetric pass through voltages (i.e., the same Vpass is applied to WLn−1 and WLn+1) on a lowest read level (i.e., R1) and a lowest program verify level (i.e., PV1) and asymmetric pass through voltages are applied to WLn−1 and WLn+1 during execution of a read operation or a program verify operation on all other read levels and program verify levels above the lowest read level/program verify level (e.g., R2/PV2, R3/PV3 . . . R15/PV15 for a QLC memory device). The use of symmetric or equal pass through voltages for both neighboring wordlines (Vpass on WLn−1=Vpass on WLn+1) for execution of a read operation on a lowest level (R1) and execution of a program verify operation on a lowest level (PV1) and asymmetric pass through voltages on WLn−1 and WLn+1 for execution of read operations and program verify operations at all other programmed levels (R2/PV2 and above) reduces “pinching” of the threshold voltage of WLn (i.e., an unwanted increase in the Vt of WLn) that can be caused by lowering the pass through on WLn−1. Furthermore, since lowering or reducing Vpass1 on WLn-1 (i.e., the side opposite the aggression) as compared to Vpass2 on WLn+1. According to embodiments, a sensed data value (e.g., a current level) associated with the target wordline is used to determine completion of the memory access operation (i.e., completion of the read operation of the target wordline).

Figure 5:
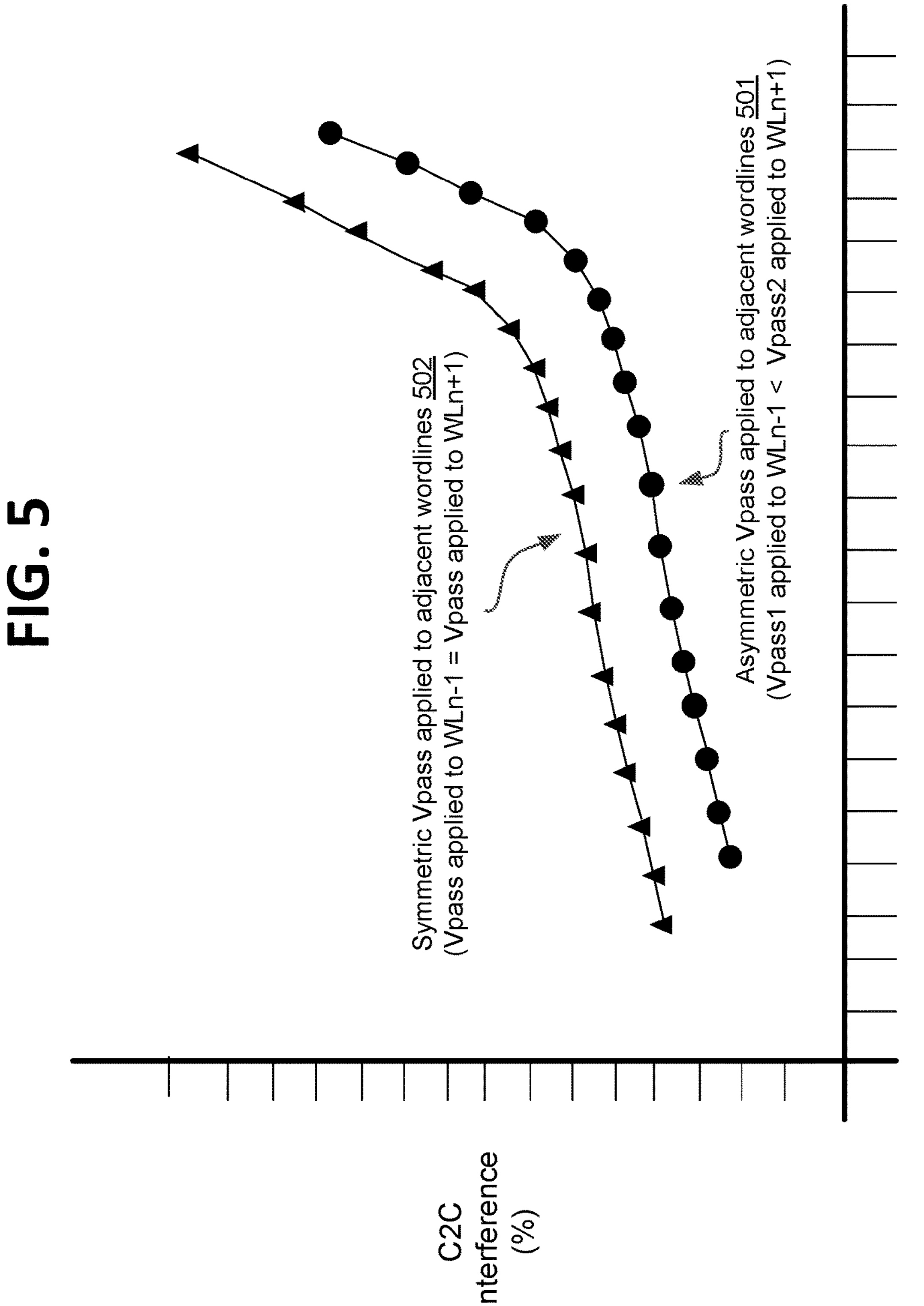
FIG. 5 illustrates a graph plotting a level or percent of cell-to-cell interference as a function of a threshold volt shift of an aggressor wordline, in accordance with one or more embodiments of the present disclosure.

FIG. 5 illustrates a graph plotting a level or percent of C2C interference as a function of a threshold volt (Vt) shift of an aggressor wordline (WLn+1), according to embodiments of the present disclosure. As shown, the C2C interference is advantageously reduced when applying an asymmetric Vpass to adjacent wordlines during a read operation or a program verify operation (501) as compared to application of a symmetric Vpass to the adjacent wordlines during a read operation or a program verify operation (502). As illustrated, the asymmetric Vpass includes the application of a first pass through voltage (Vpass1) to WLn−1 that is lower than a second pass through voltage (Vpass2) applied to WLn+1 during a read operation or a program verify operation executed on a target wordline (WLn). As shown in FIG. 5, the C2C interference level (percentage) corresponding to the asymmetric pass through voltage process during a read operation or a program verify operation of the present disclosure is improved (i.e., Vpass1 applied to WLn−1<Vpass2 applied to WLn+1), as compared to the symmetric approach (i.e., the same Vpass applied to both WLn−1 and WLn+1 for all read and program verify levels).

Figure 6:
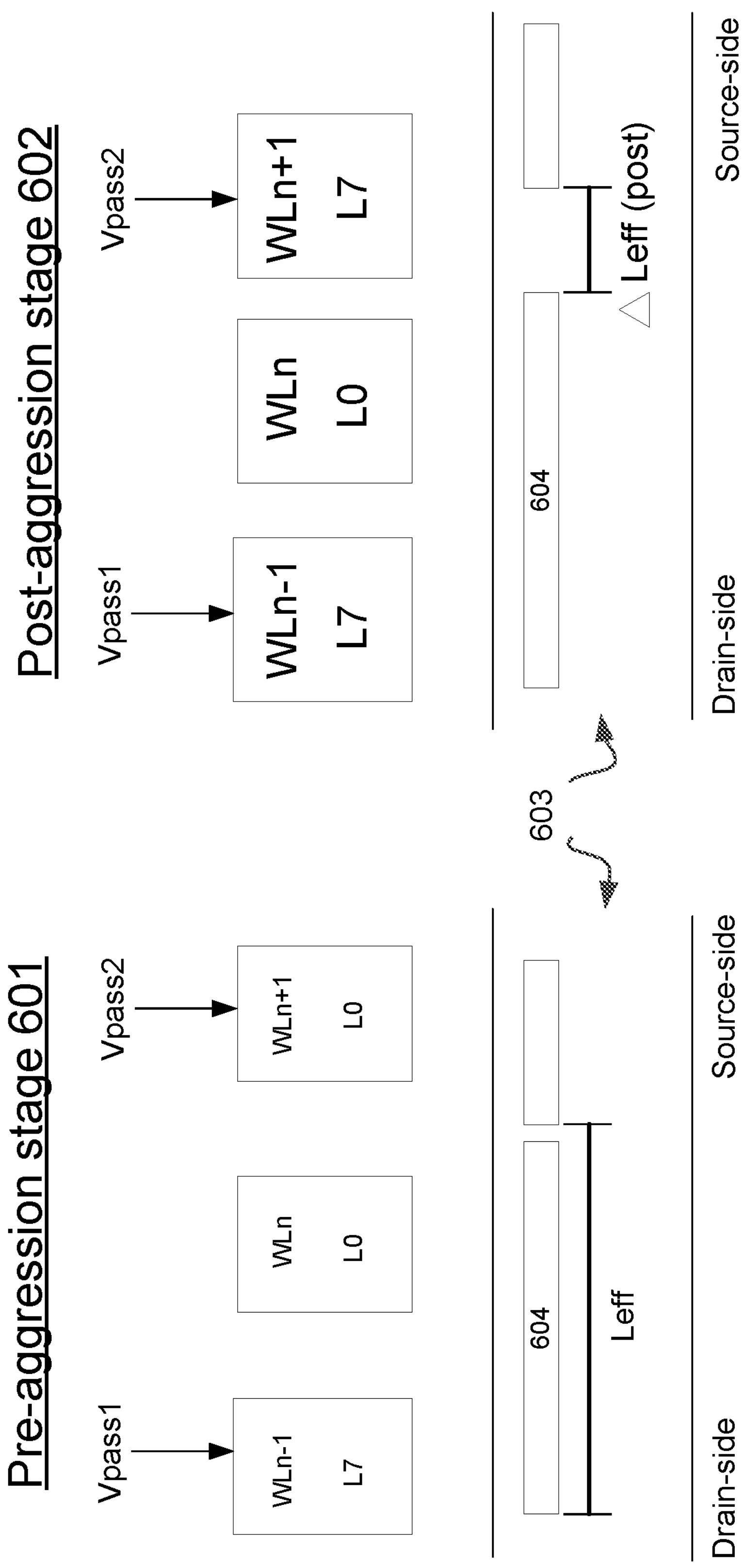
FIG. 6 illustrates example arrangements of a target wordline and corresponding adjacent wordlines during execution of a read operation or a program verify operation with an asymmetric pass through voltage applied to the neighboring wordlines during a pre-aggression stage and a post-aggression stage, in accordance with one or more embodiments of the present disclosure.

FIG. 6 illustrates example arrangements of a target wordline (WLn) and corresponding neighboring wordlines (WLn−1 and WLn+1) during execution of a read operation or a program verify operation with an asymmetric pass through voltage applied to the neighboring wordlines during a pre-aggression stage 601 and a post-aggression stage 602, according to embodiments of the present disclosure. According to embodiments, FIG. 6 illustrates a drain-to-source programming scheme including a channel 603. Advantageously, application of Vpass1 to WLn−1 and Vpass2 to WLn+1 (where Vpass1=Vpass2−Vpass_offset) during a read operation or a program verify operation causes a low free electron region 604 of the channel 603 to move toward the drain-side and away from the aggression side (i.e., the source-side). Advantageously, application of asymmetric pass through voltages to WLn−1 and WLn+1 during a read operation or read sub-operation of program verify operation causes a relative change in effective length (ΔLeff/Leff) to be reduced. The reduction in the relative change in effective length results in a reduction of short channel effects and a lower threshold voltage change related to the aggression and a corresponding lowering of the C2C interference.

FIG. 7 is a flow diagram of an example method 700 to perform a memory access operation (e.g., a read operation or a program verify operation) of a target wordline (WLn) including application of asymmetric pass through voltage levels to neighboring wordlines (WLn−1 and WLn+1) to reduce C2C interference, in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the pass through voltage manager 134 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, an operation is initiated with respect to a set of target memory cells. For example, processing logic (e.g., the pass through voltage manager of FIGS. 1A-1B) can cause a memory access operation to be initiated to read the set of target memory cells of a target wordline (WLn). The memory access operation can be initiated in response to a request received by a memory sub-system controller (e.g., the memory sub-system controller 115 of FIGS. 1A-1B) from a host system. Each target memory cell of the set of target memory cells is connected to the target wordline (WLn). According to embodiments, the memory access operation can include a read operation or a program verify operation including a read sub-operation.

At operation 720, a voltage is applied. For example, the processing logic can cause, during the memory access operation, a read voltage level (Vread) to be applied to the target wordline. In an embodiment, the read voltage level (Vread) can correspond to a programmed level of the target wordline (e.g., R1, R2, R3 . . . Rfinal, where R1 is the lowest read voltage level and Rfinal is a highest read voltage level or PV1, PV2, PV3 . . . PVfinal, where PV1 is the lowest read voltage level of a read sub-operation of a program verify operation and PVfinal is a highster read voltage level of a read sub-operation of a program verify operation).

At operation 730, pass through voltages are applied. For example, the processing logic can cause, during the memory access operation, a first pass through voltage level to be applied to a first wordline adjacent to the target wordline and a second pass through voltage level to be applied to a second wordline adjacent to the target wordline, where the first pass through voltage level is less than the second pass through voltage level. According to embodiments, the first pass through voltage level (Vpass1) applied to the first wordline (WLn−1) is equal to the second pass through voltage level (Vpass2) reduced by an offset value (Vpass_offset).

For example, Vpass_offset is in a range of approximately 0.1V to approximately 1.5V, Vpass2 can be in a range of approximately 6.0V to approximately 7.5V and Vpass1 can be in a range of approximately 4.5V to 6.0V. In an example, Vpass2 can be approximately 6.5V, Vpass_offset can be approximately 0.7V, and Vpass1 can be approximately 5.8V.

In an embodiment, the processing logic can determine the read voltage level associated with the memory access operation and, if the read voltage level is a lowest level (e.g., R1 or PV1), the processing logic can apply the same pass through voltage level to both the first wordline and the second wordline (e.g., Vpass1 equals Vpass2). In this embodiment, for all other read voltage levels (R2/PV2, R3/PV3 . . . Rfinal/PVfinal), the processing logic cause application of Vpass1 to the first wordline and Vpass2 to the second wordline, where Vpass1 is less than Vpass2 (i.e., Vpass1=Vpass2−Vpass_offset).

In an embodiment, the processing logic can cause application of Vpass1 to the first wordline and Vpass2 to the second wordline, where Vpass1 is less than Vpass2 (i.e., Vpass1=Vpass2−Vpass_offset) when applying all read voltage levels to the target wordline (e.g., R1/PV1, R2/PV2 . . . Rfinal/PVfinal).

According to embodiments, a sensed data value (e.g., a current level) associated with the target wordline is used to determine completion of the memory access operation (i.e., confirmation that the target memory cells being read have been turned on and the read operation is complete).

Figure 8:
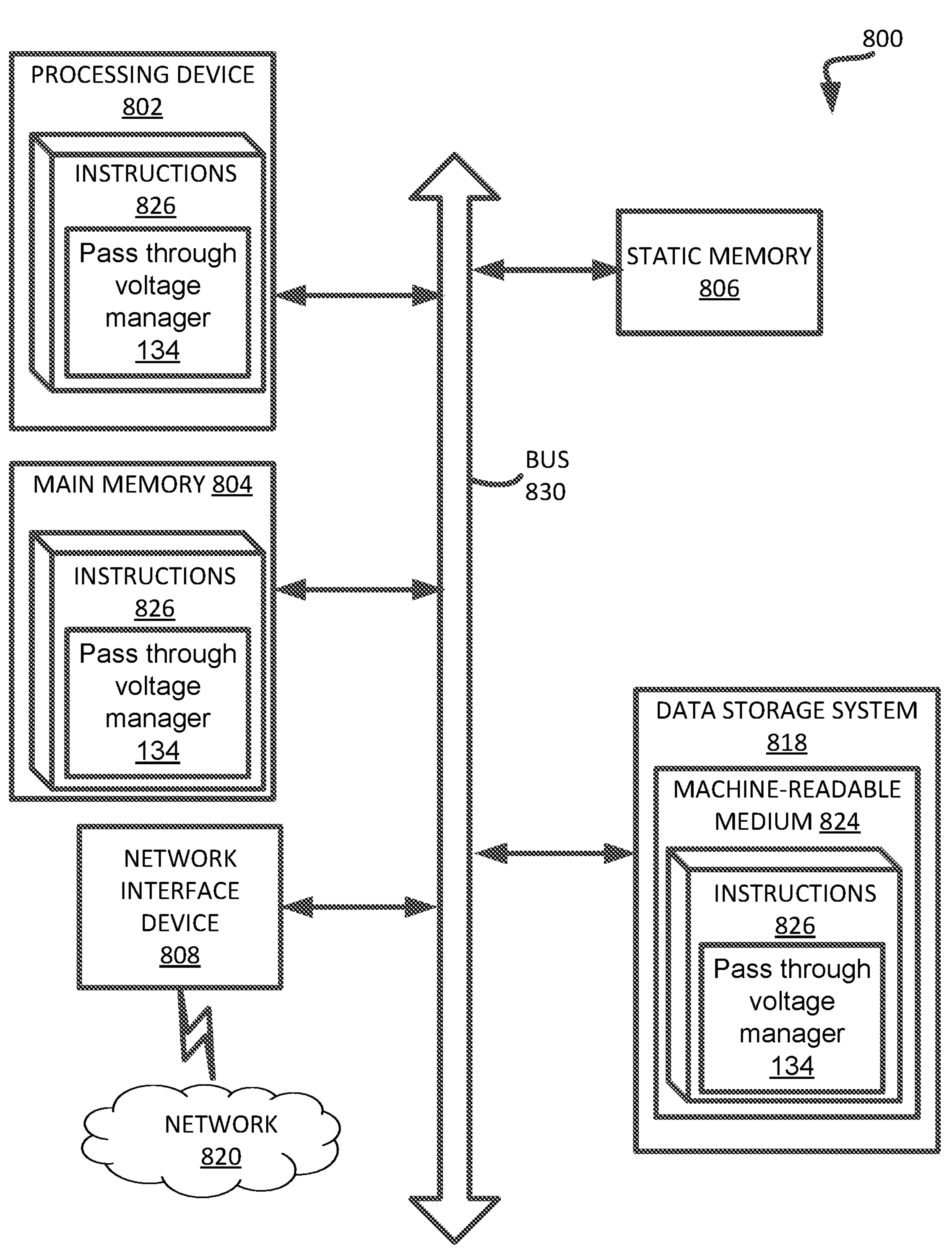
FIG. 8 is a block diagram of an example computer system in which embodiments of the present disclosure may operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the pass through voltage manager 134 of FIG. 1A and FIG. 1B). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a memory cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or RDRAM, etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 602 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1A.

In one embodiment, the instructions 826 include instructions to implement functionality corresponding to a CR component (e.g., the pass through voltage manager 134 of FIG. 1A and FIG. 1B). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's page buffers and memories into other data similarly represented as physical quantities within the computer system memories or page buffers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a memory device; and a processing device, operatively coupled with the memory device, to perform operations comprising:

initiating a read operation to read a set of target memory cells of a target wordline of the memory device;

causing, during the read operation, a read voltage level to be applied to the target wordline;

causing, during application of the read voltage level to the target wordline, a first pass through voltage level to be applied to a first unselected wordline adjacent to the target wordline on a drain side of the target wordline; and causing, during application of the read voltage level to the target wordline, a second pass through voltage level to be applied to a second unselected wordline adjacent to the target wordline on a source side of the target wordline, wherein the first pass through voltage level is less than the second pass through voltage level, and wherein the first pass through voltage level is less than the second pass through voltage level during application of each of a plurality of different read voltage levels to the target wordline.

2. The system of claim 1, wherein the first pass through voltage level is the second pass through voltage level reduced by an offset value.

3. The system of claim 1, wherein the operations further comprise sensing a current level associated with the target wordline to confirm completion of the read operation.

4. The system of claim 1, wherein the first unselected wordline adjacent to the target wordline is programmed prior to the target wordline, and wherein the target wordline is programmed prior to the second unselected wordline adjacent to the target wordline.

5. The system of claim 1, wherein the read operation is a sub-operation of a program verify operation.

6. The system of claim 1, wherein the operations further comprise determining the read voltage level is greater than a lowest read voltage level.

7. A method comprising:

initiating, by a processing device, a read operation to read a set of target memory cells of a target wordline of a memory device;

causing, during the read operation, a read voltage level to be applied to the target wordline;

causing, during application of the read voltage level to the target wordline, a first pass through voltage level to be applied to a first unselected wordline adjacent to the target wordline on a drain side of the target wordline; and causing, during application of the read voltage level to the target wordline, a second pass through voltage level to be applied to a second unselected wordline adjacent to the target wordline on a source side of the target wordline, wherein the first pass through voltage level is less than the second pass through voltage level, and wherein the first pass through voltage level is less than the second pass through voltage level during application of each of a plurality of different read voltage levels to the target wordline.

8. The method of claim 7, wherein the first pass through voltage level is the second pass through voltage level reduced by an offset value.

9. The method of claim 7, further comprising sensing a current level associated with the target wordline to confirm completion of the read operation.

10. The method of claim 7, wherein the first unselected wordline adjacent to the target wordline is programmed prior to the target wordline, and wherein the target wordline is programmed prior to the second unselected wordline adjacent to the target wordline.

11. The method of claim 7, wherein the read operation is a sub-operation of a program verify operation.

12. The method of claim 7, further comprising determining the read voltage level is greater than a lowest read voltage level.

13. A non-transitory computer-readable storage medium comprising instructions that, when executed by a processing device, cause the processing device to perform operations comprising:

initiating a read operation to read a set of target memory cells of a target wordline of a memory device;

causing, during the read operation, a read voltage level to be applied to the target wordline;

causing, during application of the read voltage level to the target wordline, a first pass through voltage level to be applied to a first unselected wordline adjacent to the target wordline on a drain side of the target wordline; and causing, during application of the read voltage level to the target wordline, a second pass through voltage level to be applied to a second unselected wordline adjacent to the target wordline on a source side of the target wordline, wherein the first pass through voltage level is less than the second pass through voltage level, and wherein the first pass through voltage level is less than the second pass through voltage level during application of each of a plurality of different read voltage levels to the target wordline.

14. The non-transitory computer-readable storage medium of claim 13, wherein the first pass through voltage level is the second pass through voltage level reduced by an offset value.

15. The non-transitory computer-readable storage medium of claim 13, wherein the operations further comprise sensing a current level associated with the target wordline to confirm completion of the read operation.

16. The non-transitory computer-readable storage medium of claim 13, wherein the first unselected wordline adjacent to the target wordline is programmed prior to the target wordline, and wherein the target wordline is programmed prior to the second unselected wordline adjacent to the target wordline.

17. The non-transitory computer-readable storage medium of claim 13, wherein the operations further comprise determining the read voltage level is greater than a lowest read voltage level.

* * * * *